United States Patent Office

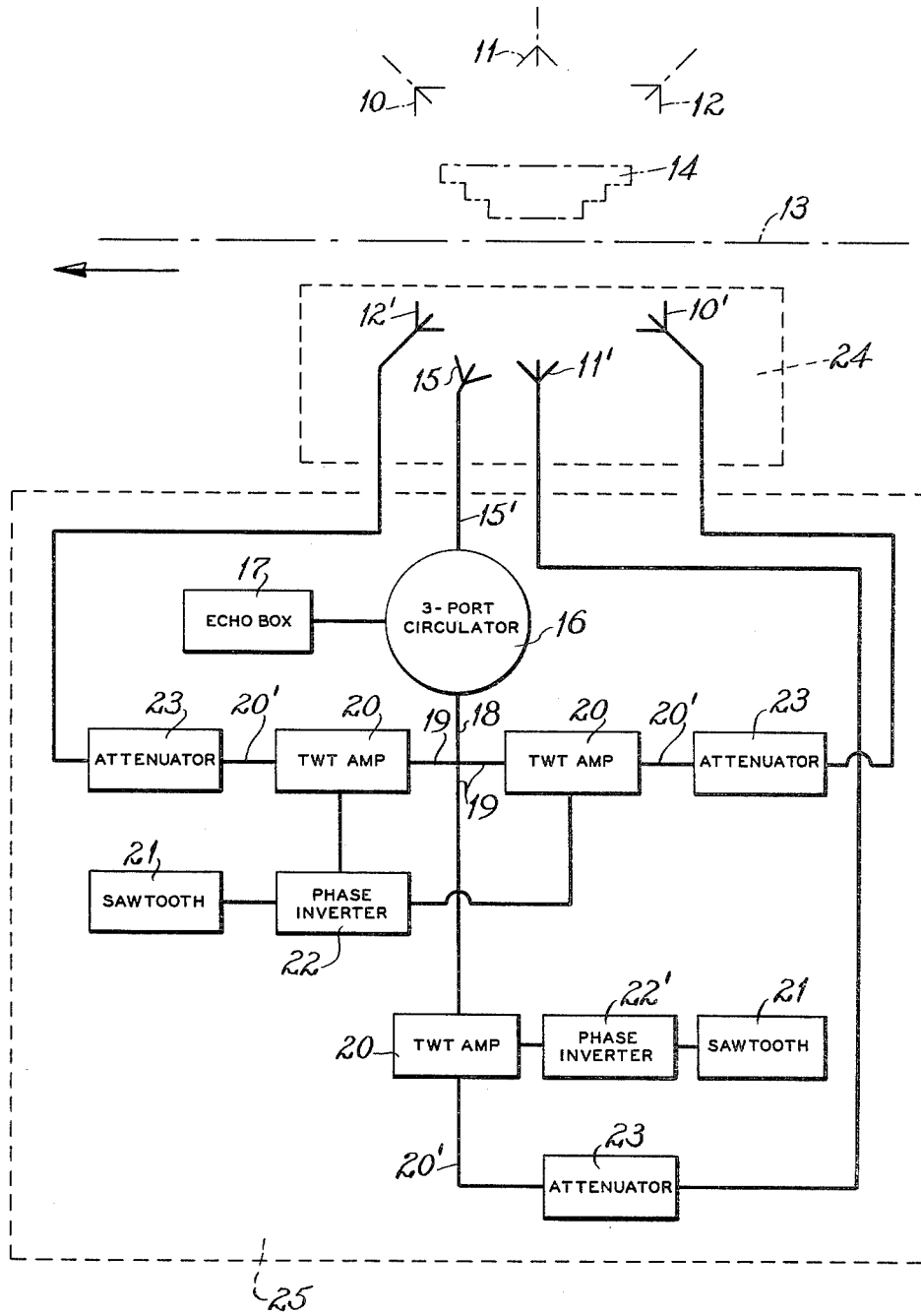

3,138,797
Patented June 23, 1964

3,138,797
TEST APPARATUS FOR RADAR DOPPLER
NAVIGATORS
Alfred A. Steinberg, Bethpage, N.Y., assignor to Republic
Aviation Corporation, Suffolk, N.Y., a corporation of
Delaware
Filed July 3, 1961, Ser. No. 121,461
5 Claims. (Cl. 343—17.7)

This invention relates to testing apparatus generally, and particularly to a test apparatus that simulates movement of a vehicle by which the operation and accuracy of pulse doppler radar navigation equipment within the vehicle may be determined without actually moving the vehicle.

Doppler radar navigation equipment or navigators have been employed in vehicles in the sea and air to determine and display information concerning operation of the vehicle, such as speed, drift, pitch, location, distance to destination, etc. To this end, microwave signal-transmitters and receivers are appropriately located within the vehicle together with associated computing equipment. The difference in frequencies of signals leaving the transmitters and returning to their receivers are fed into, and integrated and coordinated by, the associated computers to produce the desired operational data. The frequency differential of transmitted and returned microwave or RF signals is universally known as the "Doppler Effect."

The present invention in its broadset aspects proposes a test apparatus to verify or check the operation of the foregoing type of navigators prior to actual movement of the vehicle to insure that it is in proper order and operating efficiently. At the same time, the test apparatus contemplated herein is adapted to be conveniently packaged in a portable container that is readily transportable to the location of the vehicle to be tested. Moreover, no physical connection of any kind is required to be made between the instant apparatus and the vehicle under test.

In short, this invention has in view a test apparatus of the type referred to above that is characterized by simplicity of design and function with a high degree of reliability. While none of the individual parts, per se, of this apparatus is necessarily novel, the system, i.e., the combination of the several interconnected parts, is novel and produces a result not heretofore accomplished.

More specifically, the instant invention contemplates an apparatus adapted to receive a selected microwave or RF pulsed signal generated within and radiating from the vehicle. The signal thus received is thereafter modified and adjusted by the apparatus to known values corresponding to movement of the vehicle in each plane or dimension of its operation and returned to the respective associated receivers of the vehicle under test.

Thus, the proposed simulator or test apparatus delivers to the computer of the vehicle's navigator "doppler effects" substantially identical to those it receivers during actual movement of the vehicle, causing its operation in the same manner as actual operation of the vehicle. Since known values are employed in this test operation, the accuracy of the system may be determined.

With the above and other objects in view, as will be apparent, this invention consists in the construction, combination and arrangement of parts, all as hereinafter more fully described, claimed and illustrated in the accompanying drawing. The drawing shows a schematic block diagram of a test apparatus constructed in accordance with the teachings of the present invention illustrating its application to the doppler radar navigator of a vehicle such as an aircraft, submarine, etc., that operates in more than a single plane or dimension. The portions of the vehicle and navigator associated with the apparatus are shown in lightweight, broken lines alternately long and short.

The doppler radar navigator of the vehicle contemplated by the drawing has been designed and employed for accurate navigation using the doppler effect. Stated generally, this type of navigator includes antennae or horns 10, 11 and 12 corresponding, respectively, to aft, side and forward directions in relation to the general line of movement of the vehicle designated by an arrow. These horns are each adapted to transmit and receive a pulsed microwave signal of preselected frequency from and to an associated computer (not shown) carried within the vehicle. This signal or beam passes through an adjacent surface or radome 13 that defines the vehicle and may be controlled or focused by appropriate means, such as a lens 14. The frequency differential between each of the transmitted and returned signals, i.e., the doppler effect, during normal operation or movement of the vehicle is fed to the computer of the navigator. The computer is designed and adapted to integrate, coordinate and translate the doppler effect into operational data concerning the vehicle's present position, ground speed, drift angle, distance to destination, i.e., information useful to the operator of the vehicle.

The test apparatus proposed herein is adapted to be brought to the vehicle while at rest or immobile and disposed adjacent its radome 13. This apparatus comprises a pickup antenna 15 which is oriented in relation to the beams from at least one of the horns 10, 11 or 12 of the vehicle and connected by a transmission line 15' to the operating system of the apparatus. Pulsed signals or impulses radiating simultaneously from the several horns 10, 11 and 12 of the vehicle are thereby fed into a three-port circulator 16 which is a non-reciprocal network. By "non-reciprocal" is meant the signal-transmission characteristics are different in each direction so that a signal entering one port is coupled out the second port, and a signal entering the second port is coupled out the third port.

The impulses entering the circulator 16 through its inlet port are thus directed to a first exit port connected to an echo box 17 which sustains or rings them back into and through the circulator 16 and out a second exit port to produce, in effect, a continuous frequency from the circulator. A transmission line or waveguide 18 is connected to the second exit port of the circulator 16 and delivers the modified frequency to an individual, continuous phase shifting device with gain, such as a velocity-modulated electron tube 20 connected to the other end of the line 18. In the illustrated form of the invention where multiple planes of operation of the vehicle are envisioned, the line 18 divides, for example, into three spur lines 19 each connected to an individual tube 20.

The tubes 20 are identical for all intents and purposes one with the other, and each constitutes a microwave amplifier to which a sawtooth wave voltage is applied by a generator 21 to produce, in effect, a continuous phase shift of each signal passing therethrough. The resulting signal from each tube 20 is of a selected frequency differing from the input frequency to represent the doppler effect which would be created by actual motion or movement of the vehicle in the corresponding plane of its operation. To this end, each sawtooth generator 21 is adjustable whereby a selected voltage may be thereby applied to its associated tube 20 to obtain a predetermined acceleration of the frequency corresponding to the velocity of the vehicle in the particular plane or dimension of its operation.

Where the tubes 20 simulating movement of the vehicle relative to the fore and aft directions are given an equal signal velocity, a single sawtooth wave generator 21 may be employed, provided that it includes a paraphase amplifier or phase inverter 22 to generate signals of positive and negative polarity representing the opposite directions with respect to movement of the vehicle. Similarly, a phase inverter 22' may be employed in conjunction with the tube 20 connected to the antenna 11' corresponding to lateral motion of the vehicle whereby deviations of the vehicle to opposite sides of the norm are represented and adjusted.

The signal frequency thus produced by each tube 20, i.e., the doppler effect, is individually transmitted by a waveguide or line 20' to a return antenna 10', 11' and 12' disposed adjacent and corresponding to the respective aft, side and forward horns 10, 11 and 12 of the vehicle. Thus, the doppler effect of each antenna 10', 11' and 12' is directed into its complemental horn within the vehicle for delivery to the computer of the navigator for the purpose set forth above.

In the line 20' between each tube 20 and its corresponding return horn 10', 11' or 12' an attenuator 23 is incorporated. Each such attenuator 23 includes means for its adjustment whereby the magnitude of the return signal may be adjusted. By such adjustment of the respective attenuators, the altitude, for example, of the vehicle may be accurately simulated and the distance sensitivity of its navigator thereby determined.

In order to eliminate substantially all interference between the microwave signals radiating from the vehicle through the antennae 10, 11 and 12 that are picked up by the antenna 15 for transmission through the test apparatus and those that are not, the several antennae 10', 11', 12' and 15 of the apparatus are packaged in an anechoic chamber. To this end, the antennae 10', 11', 12' and 15 are appropriately mounted within a container or box 24, preferably aluminum, lined with an absorption material to prevent the reflection of spurious RF radiations from the vehicle. This box 24 is a separate package or unit isolated from the remaining components or elements comprising the apparatus which are housed within a container 25.

In the above described preferred embodiment of the invention, only forward velocity and lateral velocity which result in drift of the vehicle are simulated. It is understood that where pitch is also to be simulated, a sawtooth generator 21 adjustable within a range of desired values and individual to each tube 20 corresponding to the fore and aft directions would be incorporated in the system, rather than a single generator 21 common to both such tubes 20, as illustrated. By means of a phase inverter like 22 and 22', the positive and negative polarity of the associated generator would be employed to indicate the pitch of opposite directions, i.e., up and down, similarly to that already mentioned with respect to lateral motion.

Moreover, various combinations of the preferred embodiment may be constructed in accordance with the total concept of the invention, depending upon the specific operational data of the vehicle to be obtained. This underlying concept is to be limited only by the scope of the appended claims which have in view a vehicle operable in one, two or three planes or dimensions.

What is claimed is:

1. A test apparatus for the radar doppler navigator of a vehicle including at least one pulsed microwave signal-transmitting and -receiving means to produce a doppler effect during movement of the vehicle and a computer operatively connected to said means to integrate, coordinate and translate the doppler effect thus produced into operational data, comprising an electronic system to simulate said doppler effect when said vehicle is at rest, said system including an antenna adapted to be located adjacent said signal-transmitting and -receiving means to receive pulsed microwave signals therefrom, means connected to said antenna to receive and convert said pulsed signals to a continuous signal, adjustable phase shifting-means connected to said means and operative on said continuous signals to regulate the frequency thereof, and transmitting means connected to said continuous phase-shifting means and disposed adjacent each of said signal-transmitting and -receiving means to return said continuous signals thereto at the regulated frequency aforesaid.

2. The test apparatus of claim 1 wherein said phase-shifting means includes signal-dividing means to separate said continuous signals into isolated transmission lines, a velocity modulated electron tube in each said line, and a sawtooth generator connected to each said tube.

3. The test apparatus of claim 2 including an adjustable attenuator in each said line between each said tube and the transmitting means to regulate the magnitude of continuous, frequency regulated signals aforesaid.

4. The test apparatus of claim 1 wherein said antenna and said transmitting means are disposed within an anechoic chamber defined by walls lined with RF radiation absorbing material.

5. The test apparatus of claim 1 wherein said signal-converting means includes a nonreciprocal three-port circulator having one port connected to said antenna, a second port connected to an echo box and communicating with said one port and a third port connected to said phase-shifting-means and communicating with said second port.

References Cited in the file of this patent

UNITED STATES PATENTS 2,505,525   Clapp ------------------ Apr. 25, 1950
2,510,299   Schramm ---------------- June 6, 1950